United States Patent
Lin

(10) Patent No.: US 10,197,110 B2
(45) Date of Patent: Feb. 5, 2019

(54) QUICK STOP MECHANISM ON FOOD PROCESSOR AND FOOD PROCESSOR COMPRISING THE SAME

(71) Applicant: Join-One Electric (Shenzhen) Ltd., Shenzhen, GuangDong Province (CN)

(72) Inventor: Yu-Lung Lin, Shenzhen (CN)

(73) Assignee: JOIN-ONE ELECTRIC (SHENZHEN) LTD., Shenzhen (CN)

( * ) Notice: Subject to any disclaimer, the term of this patent is extended or adjusted under 35 U.S.C. 154(b) by 93 days.

(21) Appl. No.: 15/456,563

(22) Filed: Mar. 12, 2017

(65) Prior Publication Data

US 2018/0128326 A1    May 10, 2018

(30) Foreign Application Priority Data

Nov. 9, 2016    (CN) .................... 2016 2 1211663 U

(51) Int. Cl.

| | |
|---|---|
| *F16D 27/00* | (2006.01) |
| *F16H 3/46* | (2006.01) |
| *F16H 63/04* | (2006.01) |
| *F16H 61/02* | (2006.01) |
| *F16D 11/14* | (2006.01) |
| *F16H 57/08* | (2006.01) |
| *F16D 41/22* | (2006.01) |
| *F16H 63/00* | (2006.01) |
| *F16H 1/28* | (2006.01) |

(52) U.S. Cl.
CPC .............. *F16D 27/00* (2013.01); *F16D 11/14* (2013.01); *F16D 41/22* (2013.01); *F16H 3/46* (2013.01); *F16H 57/08* (2013.01); *F16H 61/0202* (2013.01); *F16H 63/04* (2013.01); *F16H 1/28* (2013.01); *F16H 2063/005* (2013.01)

(58) Field of Classification Search
CPC . F16D 11/14; F16D 27/00; F16H 1/28; F16H 3/46; F16H 63/04; F16H 51/0202; F16H 57/08; F16H 2063/005
USPC ........................................................ 475/149
See application file for complete search history.

(56) References Cited

U.S. PATENT DOCUMENTS

| | | | | |
|---|---|---|---|---|
| 2,722,303 A | * | 11/1955 | Utz ......................... | F16D 27/00 192/18 B |
| 4,026,397 A | * | 5/1977 | Raus ....................... | F16D 11/14 192/114 R |
| 4,458,725 A | * | 7/1984 | Schwarz .................. | D03C 1/16 139/1 E |
| 4,573,364 A | * | 3/1986 | Givan ...................... | F02N 15/06 310/83 |

(Continued)

Primary Examiner — Leslie A Nicholson, III

(57) ABSTRACT

The invention relates to the field of home appliance technology, and more particularly to a quick stop mechanism on a food processor and a food processing comprising the quick stop mechanism. The invention comprises a transmission shaft flexibly received in a gear box, the transmission shaft extends from the top of the gear box, a metal sleeve is fixed on one side of the transmission shaft, a bottom surface of a buckle ring disposed on a lower part of the metal sleeve abuts against the top of a spring, and the bottom of the spring abuts against a spring seat, the spring seat defines a through hole, a magnet is disposed on inner side of the gear box, and flexibly cooperates with the metal sleeve, the transmission shaft passes through the through hole and cooperates with a clutch, and the clutch is connected to a motor on the food processor.

4 Claims, 4 Drawing Sheets

(56) References Cited

U.S. PATENT DOCUMENTS

| | | | | |
|---|---|---|---|---|
| 5,465,819 | A * | 11/1995 | Weilant | B60K 17/20 |
| | | | | 192/35 |
| 5,980,099 | A * | 11/1999 | Soon | B01F 15/00448 |
| | | | | 366/204 |
| 6,640,693 | B2 * | 11/2003 | Brezovnik | A47J 43/085 |
| | | | | 366/287 |
| 9,234,552 | B2 * | 1/2016 | Kimes | F16D 27/09 |
| 9,347,503 | B2 * | 5/2016 | Gilmore | F16D 11/10 |
| 9,812,238 | B2 * | 11/2017 | Heravi | F16D 48/064 |
| 2011/0251008 | A1 * | 10/2011 | Schmitz | B62M 11/06 |
| | | | | 475/31 |
| 2016/0201738 | A1 * | 7/2016 | Kimes | F16D 27/00 |
| | | | | 192/84.8 |

* cited by examiner

QUICK STOP MECHANISM ON FOOD PROCESSOR AND FOOD PROCESSOR COMPRISING THE SAME

BACKGROUND OF THE INVENTION

1. Field of the Invention

The invention relates to the field of home appliance technology, and more particularly to a quick stop mechanism on a food processor and a food processing comprising the quick stop mechanism.

2. Description of the Prior Art

As a commonly used kitchen appliance, a food processor improves people's quality of live in modern society, and provides people with great convenience. To ensure safety of this kind of product, and to prevent people from being hurt by incorrect operation, normally a quick stop mechanism is arranged in every existing food processor, enabling the processor to quickly stop in case of emergency. There are two quick stopping modes of conventional food processors: the first one is done by friction force as a motor stops rotating, and the second one is done by circuit control as the motor stops rotating. As far as the first mode is concerned, long-term friction may cause wear of components, and therefore the processor has comparatively large limitation in terms of lifetime; meanwhile, after long time of use, the processor may have certain safety risks. As for the second mode, cost spent in production is too high, which makes it difficult to promote the processor on the market.

SUMMARY OF THE INVENTION

In view of the above-mentioned problems, it is an objective of the invention to provide a quick stop mechanism on a food processor and a food processing comprising the quick stop mechanism.

In accordance with an exemplary embodiment of the invention, provided is a quick stop mechanism on a food processor, the quick stop mechanism being disposed on the food processor and comprising a gear box, a transmission shaft is flexibly received in the gear box, the transmission shaft is flexibly disposed in the gear box via a first bearing, an upper part thereof extends from the top of the gear box, a metal sleeve is fixed on one side of the transmission shaft, a buckle ring is disposed on a lower part of the metal sleeve, a bottom surface of the buckle ring abuts against the top of a spring, the spring is fit on outer side of the transmission shaft, and the bottom thereof abuts against a spring seat, the spring seat is fixed in the gear box, and defines a through hole allowing a lower part of the transmission shaft to pass therethrough, a magnet is disposed on inner side of the gear box, the magnet flexibly cooperates with the metal sleeve, the bottom of the transmission shaft passes through the through hole on the spring seat and cooperates with a clutch in the gear box, and the clutch is connected to a motor on the food processor via a transmission component.

Furthermore, the transmission component comprises a driving gear cooperating with the motor, the driving gear is engaged with a tooth surface of the transmission gear group, the transmission gear group is fixed on a gear seat, the gear seat is disposed in the gear box via a second bearing, a gear block protruding upwardly is disposed on an upper end of the gear seat, the clutch is disposed on the upper part of the gear seat, the clutch is disposed in the gear box via a third bearing, the clutch is fixed to the bottom of the transmission shaft, and the bottom of the clutch flexibly cooperates with the gear block on the upper end of the gear seat.

Furthermore, a drive sleeve is disposed on the upper part of the gear box, the drive sleeve is fit on outer side of an upper part of the transmission shaft, and a silicone cap is disposed at the top of the drive sleeve.

Furthermore, a first elastic pad is disposed between the top of the first bearing and the drive sleeve, a second elastic pad is disposed between the buckle ring and the top of the spring, and a third elastic pad is disposed between the bottom of the spring seat and an upper end surface of the second bearing.

In accordance with another exemplary embodiment of the invention, provided is a food processor, comprising a motor, a food processing component, and the above-mentioned quick stop mechanism, the motor is connected to the transmission component in the quick stop mechanism, and the food processing component is disposed at the top of the transmission shaft.

The invention facilitates quick stopping of a motor by magnetic force, and features simple structure, low production cost, no wear during operation, high safety performance, and long lifetime, which make it easy to promote the processor on the market.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

For the purpose of easy illustration, the invention will be described in details hereinafter in conjunction with preferred embodiments and accompanying drawings, in which.

DETAILED DESCRIPTION

Detailed description of the invention will be given below in conjunction with accompanying drawings and specific embodiments. It should be noted that the embodiments are only meant to explain the invention, and not to limit the scope of the invention.

Figure 1:
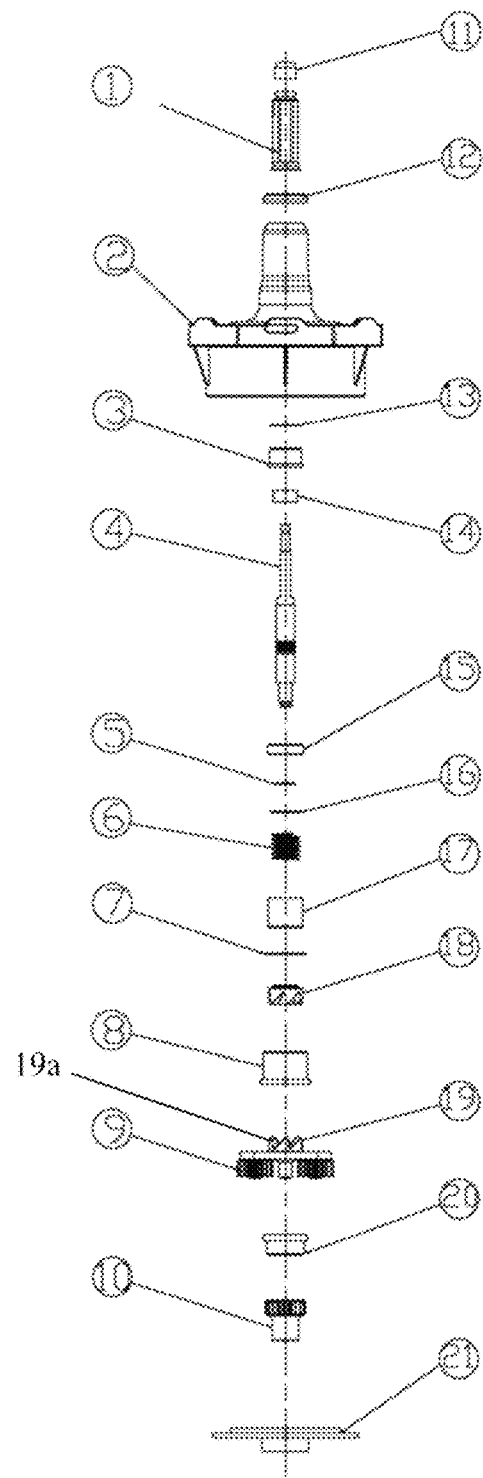
FIG. 1 is an exploded view of a quick stop mechanism of the invention.
Figure 2:
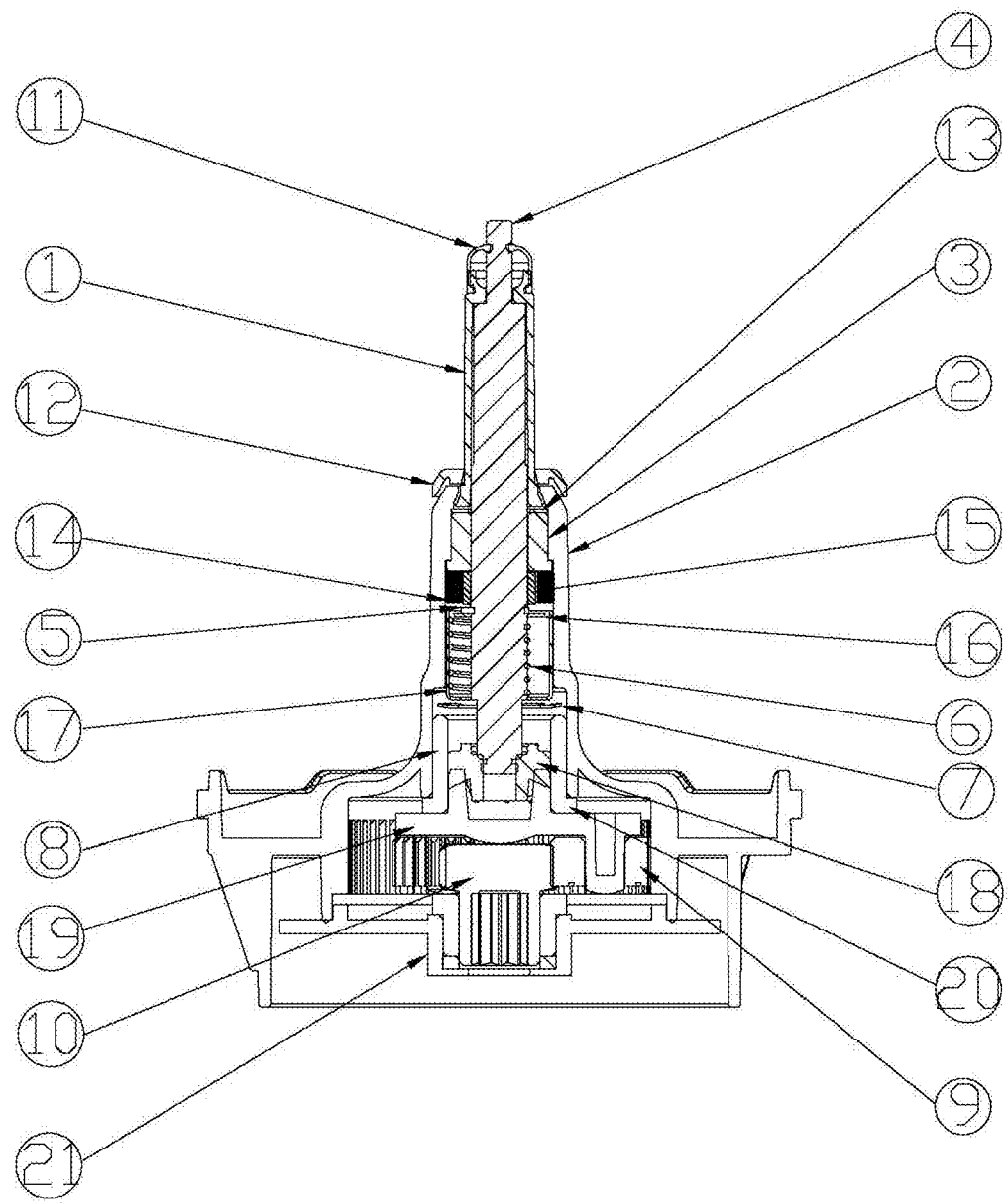
FIG. 2 is a cross sectional view of the quick stop mechanism of the invention.
Figure 3:
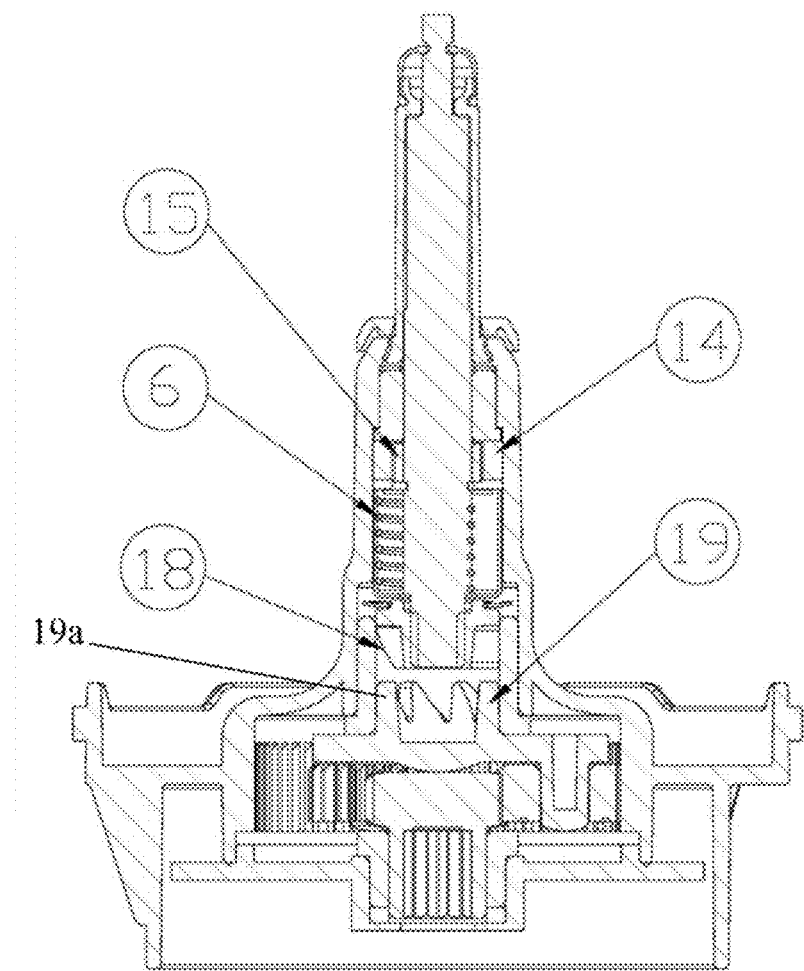
FIG. 3 illustrates operation of the quick stop mechanism of the invention as a clutch is engaged.
Figure 4:
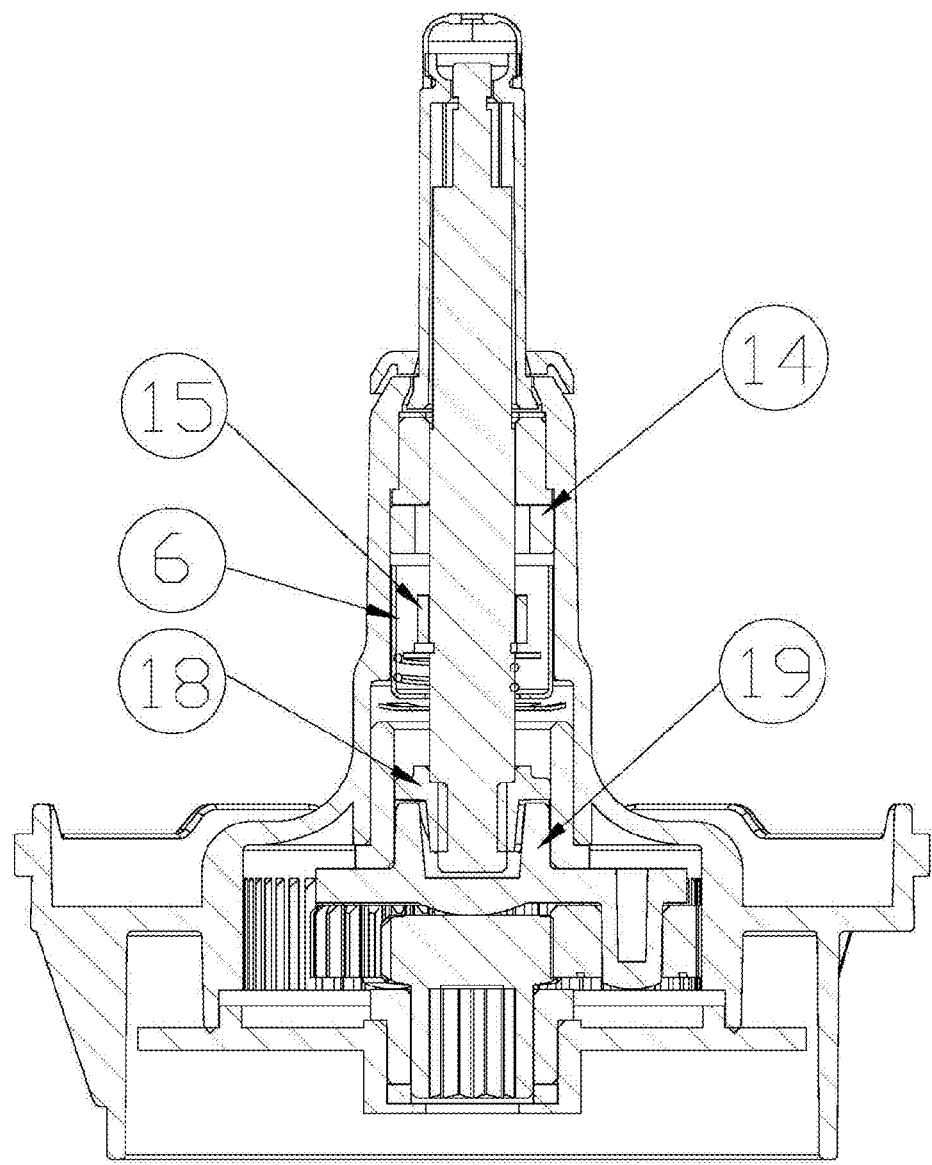
FIG. 4 illustrates operation of the quick stop mechanism of the invention as a clutch is disengaged.

Referring to FIGS. 1 to 4, a quick stop mechanism on a food processor is disposed on the food processor, and comprises a gear box 2, a gear box cover 21 is disposed at the bottom of the gear box 2, and a space for receiving all components is formed between the gearbox cover 21 and the gearbox 2. A transmission shaft 4 is flexibly received in the gear box 2, the transmission shaft 4 is flexibly disposed in the gear box 2 via a first bearing 3, the first bearing 3 operates to axially fix the transmission shaft 4, so as to ensure the transmission shaft 4 can only move up and down, and no shaking occurs during rotation thereof. An upper part of the transmission shaft 4 extends from the top of the gear box 2, a metal sleeve 15 is fixed on one side of the transmission shaft 4, a buckle ring 5 is disposed on a lower part of the metal sleeve 15, a bottom surface of the buckle ring 5 abuts against the top of a spring 6, the spring 6 is fit on outer side of the transmission shaft 4, and the bottom thereof abuts against a spring seat 17, the spring seat 17 is fixed in the gear box 2, and defines a through hole allowing a lower part of the transmission shaft 4 to pass therethrough, a magnet 14 is disposed on inner side of the gear box 2, the magnet 14 flexibly cooperates with the metal sleeve 15, the bottom of the transmission shaft 4 passes through the through hole on the spring seat 17 and cooperates with a clutch 18 in the gear box 2, and the clutch 18 is connected to a motor (not shown) on the food processor via a transmission component.

Furthermore, the transmission component comprises a driving gear 10 cooperating with the motor (not shown), the driving gear 10 is engaged with a tooth surface of the transmission gear group 9, the transmission gear group 9 is fixed on a gear seat 19, the gear seat 19 is disposed in the gear box 2 via a second bearing 8, a gear block 19a protruding upwardly is disposed on an upper end of the gear seat 19, the clutch 18 is disposed on the upper part of the gear seat 19, the clutch 18 is disposed in the gear box 2 via a third bearing 20, the clutch 18 is fixed to the bottom of the transmission shaft 4, and the bottom of the clutch 18 flexibly cooperates with the gear block 19a on the upper end of the gear seat 19.

Furthermore, a drive sleeve 1 is disposed on the upper part of the gear box 2, the drive sleeve 1 is fit on outer side of an upper part of the transmission shaft 4, and a silicone cap 11 is disposed at the top of the drive sleeve 1.

Furthermore, a first elastic pad 13 is disposed between the top of the first bearing 3 and the drive sleeve 1, a second elastic pad 16 is disposed between the buckle ring 5 and the top of the spring 6, and a third elastic pad 7 is disposed between the bottom of the spring seat 17 and an upper end surface of the second bearing 8.

The invention is assembled as follows: firstly the drive sleeve 1 is placed in the gear box 2, the silicone cap 11 is fit thereon, the first bearing 3 and the magnet 14 are put therein after the first elastic pad 13 is placed therein, then the buckle ring 5, the second elastic pad 16, the spring 6, the spring seat 17, the third elastic pad 7, the clutch 18 are sequentially fit thereon after the metal sleeve 15 is placed in the transmission shaft 4, after that the second bearing 8 is placed therein, the transmission gear group 9 is disposed on the gear seat 19 and then put into the gear box 2, then the driving gear 10 is disposed in the middle of the transmission gear group 9, the gear box cover fit with the third bearing 20 is pressed in the gear box 2, and finally a bearing seat 12 is placed therein.

The transmission shaft of the invention is disposed in the gear box 2, and can move up and down under the action of external force. The metal sleeve 15 is fixed on the transmission shaft 4, and can move along with the transmission shaft 4. The magnet 14 is fixed on inner side of the gear box 2 opposite to the metal sleeve 15.

Operation principle of the invention is: as external force is applied on the transmission shaft 4, the transmission shaft 4 moves down, and twisting force output by the motor (not shown) can be transferred to the transmission shaft 4 via the transmission gear group 9 and the clutch 18, making it possible to process fruits, vegetables or meats by cooperation of other components. As the external force is removed, the transmission shaft 4 moves up under the action of the spring 6, the twisting force output by the motor (not shown) cannot be transferred to the transmission shaft 4, and the metal sleeve 15 fit on the transmission shaft 4 is coincident/not coincident with the magnet 14 during moving up/down of the transmission shaft 4. Being in a coincident position, the magnet 14 applies absorption force on the metal sleeve 15, making it possible for the transmission shaft 4 to instantly eliminate inertia without being affected by force generated by the motor (not shown). As the magnet is in a non-coincident position, the absorption force disappears.

The invention also provides a food processor, comprising a motor (not shown), a food processing component (not shown), and the above-mentioned quick stop mechanism. The motor (not shown) is connected to the transmission component in the quick stop mechanism; the food processing component (not shown) is disposed at the top of the transmission shaft 4. Force generated by the motor (not shown) is transferred to the food processing component (not shown) via the transmission shaft 4, to process fruits, vegetables, or meats. The food processing component (not shown) comprises a grinder, a slider, an agitator and so on.

While preferred embodiments of the invention have been described above, the invention is not limited to disclosure in the embodiments and the accompanying drawings. Any changes or modifications without departing from the spirit of the invention fall within the scope of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A quick stop mechanism used on a food processor and comprising:
   a gear box;
   a transmission shaft flexibly received and disposed in said gear box via a first bearing, an upper part thereof extending from the top of said gear box;
   a metal sleeve fixed on one side of said transmission shaft;
   a buckle ring disposed on a lower part of said metal sleeve and a bottom surface thereof abutting against the top of a spring, with said spring fitting on outer side of said transmission shaft, and the bottom thereof abutting against a spring seat;
   said spring seat fixed in said gear box and defining a through hole for allowing a lower part of said transmission shaft to pass therethrough;
   a magnet disposed on inner side of said gear box and flexibly cooperated with and opposite to said metal sleeve;
   the bottom of said transmission shaft passing through said through hole on said spring seat and cooperated with a clutch in said gear box, and said clutch connected to said food processor via a transmission component; and wherein
   the transmission shaft can move up and down under the action of external force and the metal sleeve can move along with the transmission shaft.

2. The quick stop mechanism on a food processor of claim 1, wherein said transmission component comprises a driving gear, said driving gear is engaged with a tooth surface of a transmission gear group, said transmission gear group is fixed on a gear seat, said gear seat is disposed in said gear box via a second bearing, a gear block protruding upwardly is disposed on an upper end of said gear seat, said clutch is disposed on said upper part of said gear seat and disposed in said gear box via a third bearing, said clutch is fixed to the bottom of said transmission shaft, and the bottom of said clutch flexibly cooperates with said gear block on said upper end of said gear seat.

3. The quick stop mechanism on a food processor of claim 2, wherein a drive sleeve is disposed on said upper part of said gear box, said drive sleeve is fit on outer side of an upper part of said transmission shaft, and a silicone cap is disposed at the top of said drive sleeve.

4. The quick stop mechanism on a food processor of claim 3, wherein a first elastic pad is disposed between the top of said first bearing and said drive sleeve, a second elastic pad is disposed between said buckle ring and the top of said spring, and a third elastic pad is disposed between the bottom of said spring seat and an upper end surface of said second bearing.

* * * * *